United States Patent [19]

Moritz

[11] 4,384,594
[45] May 24, 1983

[54] ENERGY CONDUIT SUPPORT

[75] Inventor: Werner Moritz, Siegen, Fed. Rep. of Germany

[73] Assignee: Kabelschlepp Gesellschaft mit beschraänkter Haftung, Siegen, Fed. Rep. of Germany

[21] Appl. No.: 258,860

[22] Filed: Apr. 29, 1981

[30] Foreign Application Priority Data

Apr. 30, 1980 [DE] Fed. Rep. of Germany ....... 3016603
Apr. 30, 1980 [DE] Fed. Rep. of Germany ....... 3016628

[51] Int. Cl.³ .............................................. F16L 11/00
[52] U.S. Cl. .................................... 138/120; 138/157; 191/12 C; 285/163
[58] Field of Search ............... 138/118, 120, 110, 115, 138/116, 117, 156, 157, 159, 161, 162, 166, 168, 108, 121, 163, 155, 178; 137/615; 24/241 S, 236, 243 R; 191/12 R, 12 C; 59/78.1; 285/163, 164; 248/62, 74 R; 174/69; 403/52, 112, 229, 305, 6

[56] References Cited

U.S. PATENT DOCUMENTS

| | | | |
|---|---|---|---|
| 1,209,083 | 12/1916 | Wagner | 24/241 S |
| 1,255,577 | 2/1918 | Berry | 138/120 X |
| 2,550,725 | 5/1951 | Schultz | 138/116 |
| 2,585,054 | 2/1952 | Stachura | 138/128 X |
| 2,643,680 | 6/1953 | Kaiser | 138/120 |
| 3,060,972 | 10/1962 | Sheldon | 138/120 |
| 3,330,105 | 7/1967 | Weber | 138/120 X |
| 3,517,702 | 6/1970 | Mueller et al. | 138/168 X |
| 4,111,236 | 9/1978 | Moritz | 138/120 |
| 4,228,825 | 10/1980 | Moritz et al. | 138/120 |

FOREIGN PATENT DOCUMENTS

| | | | |
|---|---|---|---|
| 2357908 | 5/1975 | Fed. Rep. of Germany | 59/78.1 |
| 6602992 | 9/1966 | Netherlands | 138/166 |

Primary Examiner—Stephen Marcus
Assistant Examiner—William R. Sharp
Attorney, Agent, or Firm—Martin A. Farber

[57] ABSTRACT

An energy conduit support for an arrangement between a movable load-consumer and a stationary connection, comprising narrow tubular members with outwardly directed abutments and wide tubular members made of two tubular member halves with inwardly directed abutments, which engage behind and can be bent at an angle relative to each other in one direction, a channel being formed by the abutments of the narrow tubular members, the width of the channel determining the radius of curvature. The channel of the narrow tubular members is formed on two opposite side walls of different widths and on the two other side walls conically. The tubular member halves of the wide tubular members are formed alike and turned 180 degrees with respect to each another pushed on the narrow tubular members and connected with each other.

12 Claims, 13 Drawing Figures

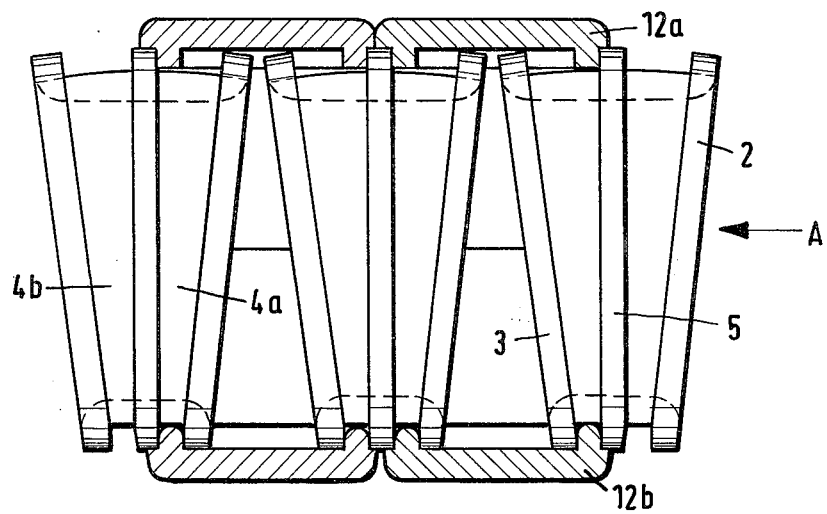
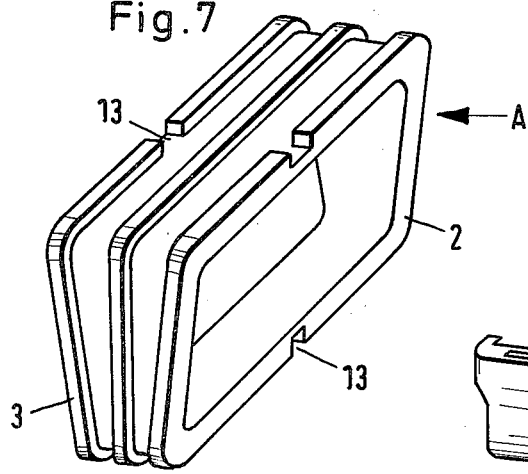
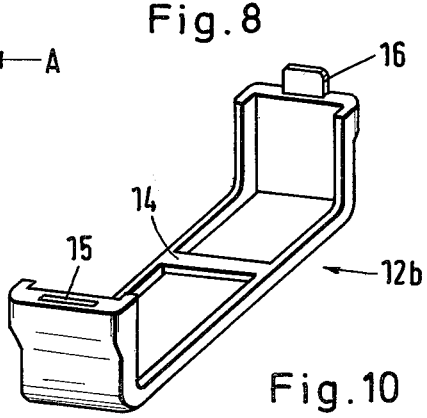
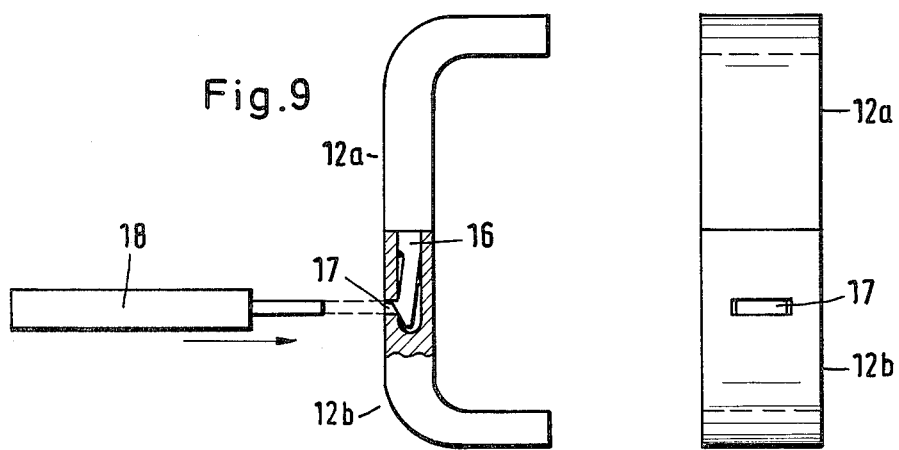

ENERGY CONDUIT SUPPORT

The present invention relates to an energy conduit support for the arrangement between a movable load-consumer and a stationary connection, comprising narrow tubular members with outwardly directed abutments and wide tubular members made of two tubular member halves with inwardly directed abutments, which engage behind and can be bent at an angle relative to each other in one direction, a channel being formed by the abutments of the narrow tubular members, the width of the channel determining the radius of curvature.

From West German OS No. 28 05 832 (U.S. Pat. No. 4,228,825) an energy conduit support of the above-described type is known. In that energy conduit support the narrow tubular members are formed symmetrically while the wide tubular members are shortened by the width of one groove on both sides as seen in the longitudinal direction of the energy conduit support so that the energy conduit support can be curved to only one side out of its flattened stretched out position. With this known energy conduit support, if the two tubular member halves of the wide tubular members are fastened, in a middle plane arranged perpendicularly to the curvature plane, with one another or to the narrow tubular members, they indeed can comprise identical constructional parts, however they must be shortened in the vicinity of a cross-sectional half, thus they must be formed unsymmetrically. Since it has proven suitable with this known energy conduit carrier to place the connection between the tubular member halves of the wide tubular members as much as possible in the plane of curvature or yet at least in a plane extending parallel thereto, since in this vicinity the stress of the connection is the smallest, the tubular member halves of the wide tubular members comprise construction parts of different widths.

Proceeding from this, it is an object of the present invention to improve the known energy conduit support carrier such that the tubular member halves of the wide tubular members can comprise construction parts which are formed symmetrically and identically and the energy conduit carrier has a good lateral rigidity and torsional rigidity.

In accordance with the present invention, the channel (4) of the narrow tubular members (A) is formed on two opposite side walls of different width and on the two other side walls conically and that the tubular member halves (6a, 6b) of the wide tubular members (B) are formed identically and swung 180 degrees with respect to one another pushed on the narrow tubular members (A) and connected with one another.

With an energy conduit carrier formed in accordance with the invention thus the peripheral channel running around the narrow tubular members is formed of different widths, whereby the conicity of the transition between the wide part on a side wall and the narrow part on the opposite side wall is simultaneously a measure for the radius of curvature. In this manner, it suffices to make the narrow part of the peripheral channel precisely so wide that the abutments of the wide tubular members still can engage with some play. Since the narrow tubular members, as a rule, are injection molded of synthetic material or plastic, the production of the channel with different widths, and respectively, abutments extending at an angle relative to one another on two opposite side walls, cause no difficulties. The advantage of an energy conduit carrier formed in accordance with the present invention now is that the two tubular member halves of the wide tubular members are constructionally the same and can be inserted together rotated by 180 degrees with respect to one another over the narrow tubular members. In this manner deviating manufacturing tolerances of the tubular member halves which are formed of different widths, no longer cause disturbances during assembly. Finally, the advantage exists with the energy conduit carrier formed in accordance with the present invention that the channel of the narrow tubular members is opened only with the movement of the energy conduit carrier in the area of curvature, while it is closed in the flattened areas and no longer can foreign bodies deposit therein.

The identically formed tubular member halves of the wide tubular members can be made from a thin metal plate or of plastic. In the embodiment made of metal plate or sheet, the connection can be produced by means of expansion rivets or the like inserted in the overlapping areas. In the embodiment made of plastic, a snap connection can be used which comprises a recess and a hook. In order for the snap connection to be releasable, the resess can be cut in with a window in which the hooks are snapped in engagingly and are releasable from the outside with a tool.

In a further embodiment of the tubular member halves of the wide tubular members made of plastic it has proven advantageous for the abutments (2,3) of the narrow tubular members (A) on the upper and the lower side to be provided in the middle with grooves (13) and to arrange a web or stay (14) on the inner side of the tubular member halves (12a, 12b) of the wide tubular members (B), which stay engages into the grooves. By the engagement of the stays in the grooves of the abutments the torsional rigidity of the entire energy conduit carrier which is produced of plastic is substantially improved.

For a sufficient lateral and torsional rigidity with oversized lengths it has also proven advantageous to form slots (23) arranged on the inside at the upper and lower sides of the narrow tubular members (A) and to pull bands (24) therein. In special cases of use, it can also be meaningful to pull in additional intermediate bands, in order to divide the interior space of the energy conduit carrier into different floors or levels for thick and thinner cable or for cable and flexible tubes so that they can not slip or slide into one another and/or turn around one another for use according to its purpose.

The slots suitably should be narrow in the middle and widened toward the entrance and exit so that the bands are not bent in the radius of curvature. The bands themselves can be made of steel as well as of a stiff yet also elastic synthetic material or plastic.

An energy conduit carrier formed according to the invention in this embodiment has an exceptionally good lateral and torsional rigidity with, respectively, one band each pulled-in at the upper side and at the lower side even with long lengths. It consequently can extend bridging over a larger self-supporting length even with loading with heavy weights.

With the above and other objects and advantages in view, the present invention will become more clearly understood in connection with the detailed description of preferred embodiments, when considered with the accompanying drawings, of which:

FIG. 6 is a cross-sectional view of some tubular members of an energy conduit carrier which are connected with one another, the wide tubular members of the carrier being made of plastic material;

FIG. 7 is a perspective illustration of one tubular member for the embodiment according to FIG. 6;

FIG. 8 is a perspective illustration of one tubular member half of a second tubular member made of plastic;

FIG. 9 is a cross-sectional view of a snap-connection for the two tubular member halves of a wide tubular member made of plastic;

FIG. 10 is an elevation view from the outside of a snap-connection according to FIG. 9;

FIG. 12 is a front plan view of an additional embodiment of a narrow tubular member with slots for a band which can be pulled in.

Figure 1:
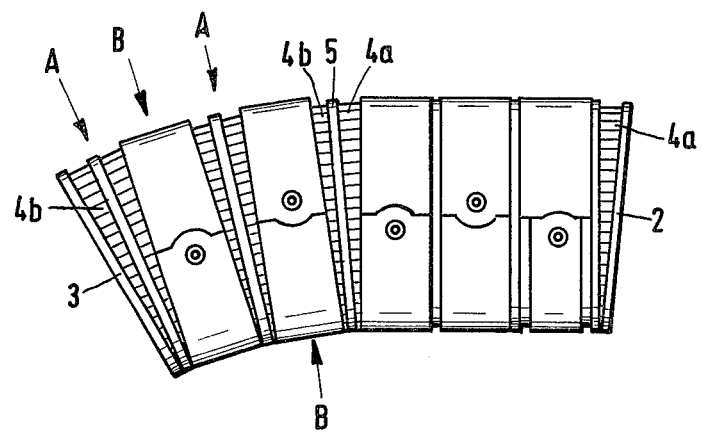
FIG. 1 is a side elevational view of a plurality of tubular members of an energy conduit carrier which are connected with one another.
Figure 2:
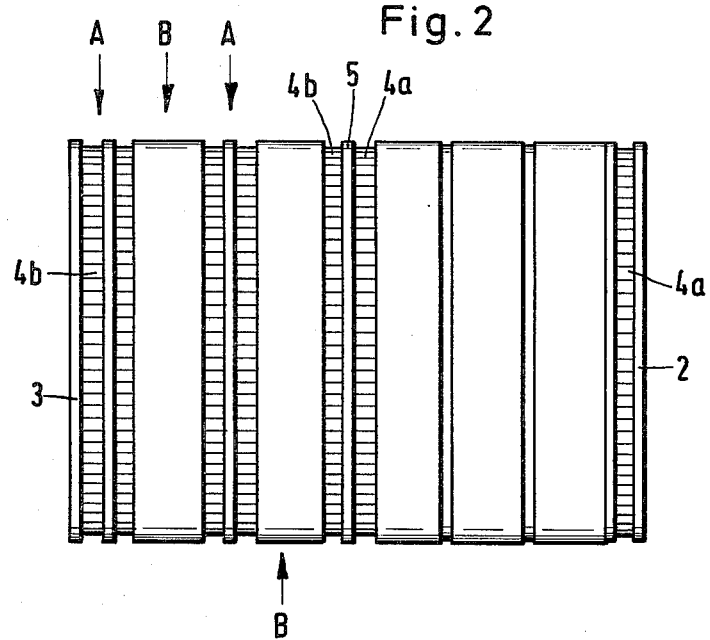
FIG. 2 is a top plan view of the connected tubular members of FIG. 1.
Figure 11:
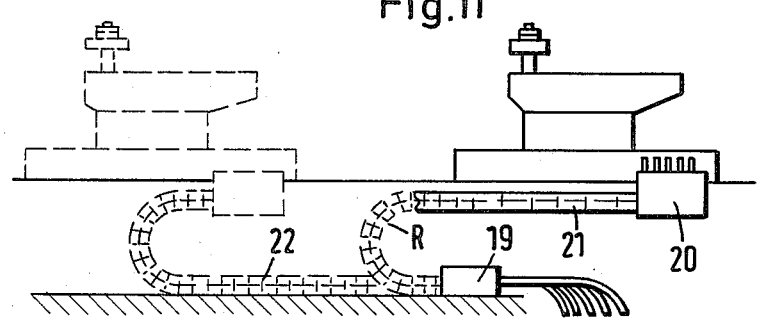
FIG. 11 shows a functional diagram for a self-supporting energy carrier support between a moveable load-consuming device and a stationary connection.
Figure 4:
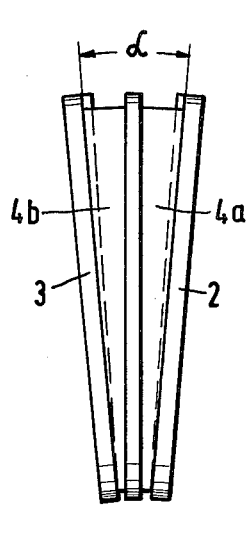
FIG. 4 is a side elevational view of the same narrow tubular member.
Figure 3:
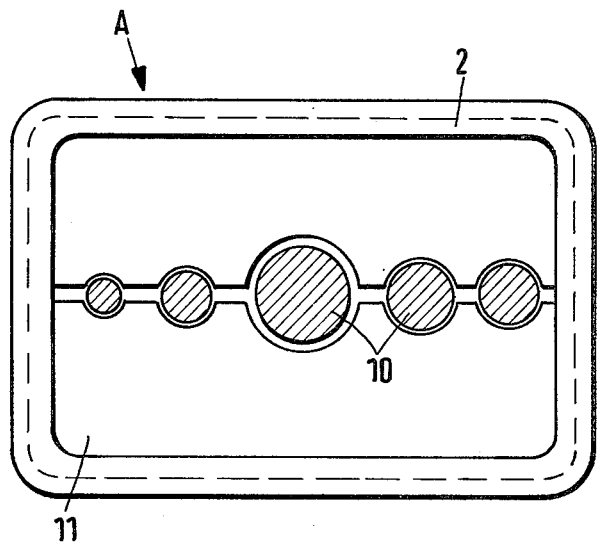
FIG. 3 is a front plan view of one narrow tubular member.

An energy conduit carrier or support formed in accordance with the present invention comprises an alternating sequence of narrow tubular members A and wide tubular members B, which are inserted into each other in a form-locked member (that is, held together by their interlocking forms) and which from the flattened position (right-hand side in FIG. 1) can be pivoted towards each other only towards one side, while in the flattened position they form a rigid tubular line with respect to the other three sides. Each narrow tubular member A in the illustrated embodiment comprises a ring 1, which on the outer periphery forms a channel 4 limited by outer abutments 2, 3, which channel is divided, by an abutment ring 5 which is arranged in the center plane, into two partial channels 4a and 4b. On the upper and lower sides, the partial channels 4a and 4b are formed with different widths and are formed conically on the sides lying therebetween. The two abutments 2 and 3 define an angle alpha $\alpha$ which determines the radius of curvature R (cf. FIG. 1). A change of the radius of curvature is possible in a simple manner by somewhat widening the abutments 2, 3, as has been illustrated schematically in FIG. 4 with dashed lines.

Figure 5:
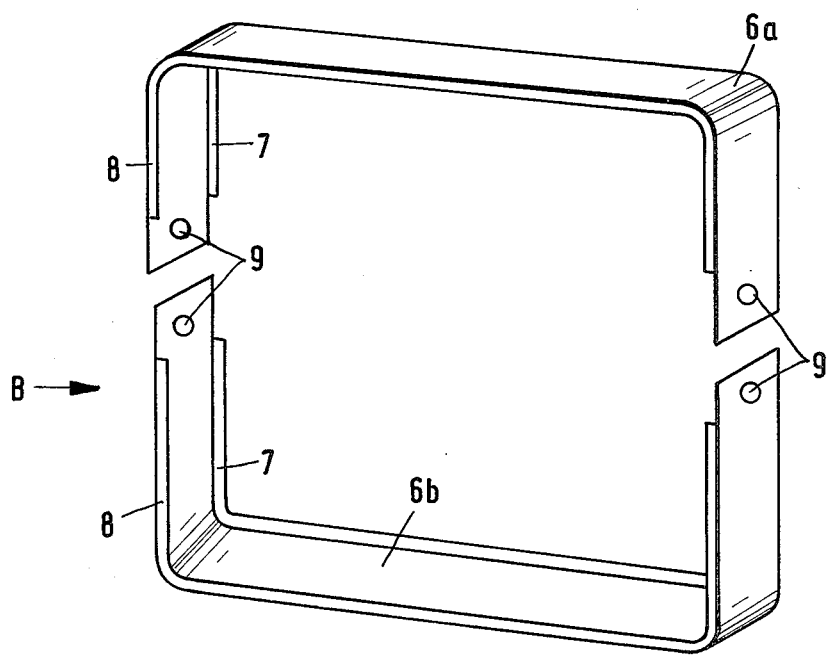
FIG. 5 is an exploded perspective illustration of a wide tubular member assembled of two identically formed tubular member halves made of metallic plate.

Each tubular member B in the embodiment according to FIG. 5 comprises two tubular member halves 6, 6 which are formed identically in construction and whose connections are located on both sides of the middle (or neutral) plane of curvature. The tubular member halves 6a and 6b have inwardly directed abutments 7 and 8, which engage in the partial channels 4a and 4b on the adjacent narrow tubular members A on both sides respectively. In the overlapping areas on the ends of the legs of the two tubular member halves 6a and 6b, the abutments 7 and 8 are absent. In these overlapping areas in the outer walls of the two tubular member halves 6a and 6b, bores 9 are formed and arranged for the insertion of expansion-rivets or the like. The legs of a tubular member half 6a or 6b are formed of different lengths so that identical construction parts can be used.

The narrow tubular members A preferably are made of an insulation material, particularly plastic, so that they form on their inner side a smooth and protective covering for energy conduits 10. However, it is also possible to form inwardly projecting holders 11 for the energy conduits 10 in order to hold same in a defined middle position.

The wide tubular members B are suitably punched or embossed from thin metal sheet. In this connection, it is possible to emboss outwardly projecting beads in the center of the tubular member halves 6a and 6b, which beads on the one hand increase the dimensional stability and on the other hand serve as a resting or abutment surface for the energy conduit support when it is used in accordance with its purpose. Furthermore, it is possible to form openings, for ventilation of the interior, in the arms of the tubular member halves 6a and 6b, so that no heat build-up can take place.

The two tubular member halves 12a and 12b of the wide tubular members B however can also be injection molded of plastic. For this embodiment grooves 13 are provided in the abutments 2 and 3 of the narrow tubular members A, in which grooves a web or stay 14 engages, the web or stay 14 being arranged on the inner side of the tubular member halves 12a and 12b of the wide tubular members B.

The two tubular member halves 12a and 12b of the wide tubular members B made of plastic are inserted together by means of a snap connection, which snap connection is made of a recess 15 (FIG. 8) formed in one end of a tubular member half and a hook 16 injection molded on the other end thereof. In order for this snap connection to be able to be released again, the recess 15 in cut-in with a window 17 in which a tool 18 can be introduced from the outside.

If the connection between the two tubular member halves 12a and 12b of a wide tubular member B no longer is necessary to be released, instead of the hook 16 also a smooth strip tongue, shackle or joint bar can be pushed into the recess 15 and welded in this position by means of ultrasonic welding.

An energy conduit support constructed and assembled in accordance with the foregoing is intended to be used between a fixed connection 19 and a moveable load-consumer 20, for example, the carriage of a machine tool in order to guide the energy conduits 10, and particularly cable and flexible tubes for electricity, compressed air and/or coolant, in a gentle stress-relieved manner. In this connection the energy conduit carrier must be self-supporting in its upper course 21 so that it does not sag and the energy conduits 10 do not buckle. Towards its lower course 22 the energy conduit carrier should be able to be curved only by a radius R, which corresponds to the permissible radius of flexure of the most sensitive energy conduit 10. These conditions for a self-supporting construction of the energy conduit carrier, the maintenance of a given radius of curvature as well as the protective stress-relieved guidance of the energy conduits 10 are satisfied by the shaping of the narrow tubular members A and of the wide tubular members B in accordance with the present invention.

Figure 12:
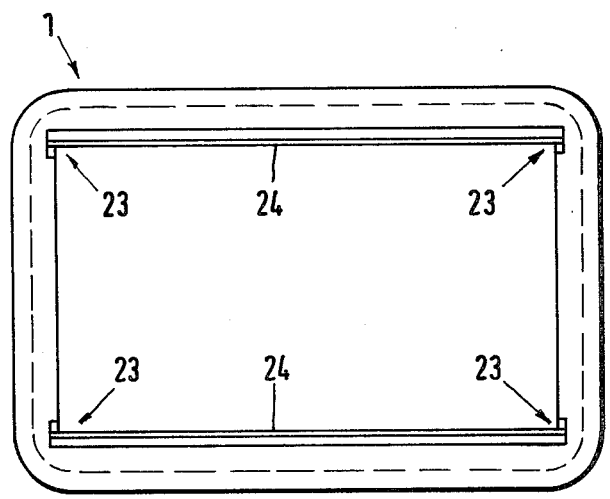

In the embodiment according to FIG. 12 the ring 1 on the side walls at the inner side at the top and at the bottom are provided with slots 23, in which, respectively, there engages one band 24 with its edges, each band extending over the entire width of the member. The slots 23 are narrower in the center than at the entrance and exit, so that the bands 24 cannot be bent during running through the curving area.

Figure 13:
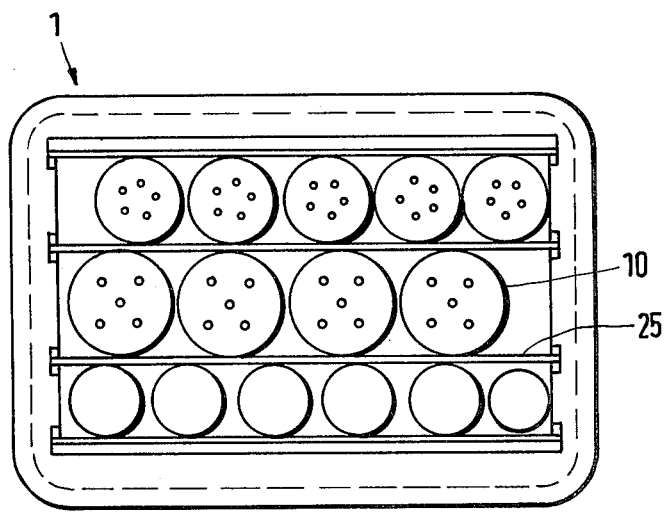
FIG. 13 is a front plan view of a modification of FIG. 12 of a narrow tubular member with several floors or levels of pulled-in bands.

With the embodiment of the ring 1 as illustrated in FIG. 13 additional slots 23 are provided so that a plurality of intermediate bands 25 can be pulled-in, which bands subdivide the interior space of the energy conduit carrier into different levels or floors. In this manner it is possible to hold different thickness energy conduits 10 as well also for large lengths to carefully separate them from one another so that they do not slide or slip by one another.

While I have disclosed embodiments of my invention it is to be understood that this embodiment is given by example only and not in a limiting sense.

I claim:

1. In an energy conduit support for the arrangement between a movable load-consumer and a stationary connection, comprising narrow tubular members with outwardly directed abutments and wide tubular members made of two tubular member halves with inwardly directed abutments, the narrow and wide tubular members via the respective abutments engage behind and can be bent at an angle relative to each other in one direction, a channel being formed by the abutments of the narrow tubular members, the width of the channel determining the radius of curvature, the improvement wherein the narrow tubular members have two opposite side walls and two other side walls, the outwardly directed abutments of each of the narrow tubular members form a channel therebetween on the two opposite side walls of different width and on the two other side walls of conical shape, and the two tubular member halves of each of the wide tubular members are substantially identical and swung inverted 180 degrees with respect to one another pushed on the narrow tubular members and are connected with one another.

2. The energy conduit support according to claim 1, wherein each said narrow tubular member is formed with an outwardly directed abutment ring between said outwardly directed abutments dividing said channel into two substantially like sized partial channels.

3. The energy conduit support according to claim 1, wherein each of said tubular member halves of said wide tubular members is formed with two legs of different length.

4. The energy conduit support according to claim 1, wherein said outwardly directed abutments of the narrow tubular members on upper and lower sides are formed in the middle with grooves, and said tubular member halves of said wide tubular members are each formed with a stay on an inner side thereof, said stays engage into said grooves, respectively.

5. The energy conduit support according to claim 1, wherein one of said tubular member halves of each of said wide tubular members is formed on an end thereof with a recess and on another end thereof with a hook, said hook of one of said tubular member halves of said each wide tubular member engages in said recess of the other of said tubular member halves of said each wide tubular member.

6. The energy conduit support according to claim 5, wherein said recess is cut-in by a window, and said hook catches in said window.

7. The energy conduit support according to claim 1, wherein said other side walls of the narrow tubular members on the inner side are formed with slots, bands are pulled into said slots spaced from and parallel to one another.

8. The energy conduit support according to claim 7, wherein said slots and said bands are arranged at the top and bottom of said narrow tubular members.

9. The energy conduit support according to claim 8, wherein said other side walls are formed with at least one pair of intermediate slots between said first-mentioned slots, at least one intermediate band is pulled-in said at least one pair of intermediate slots and is disposed between said first-mentioned bands.

10. The energy conduit support according to claim 7, wherein said bands are made of steel.

11. The energy conduit support according to claim 7, wherein said bands are made of plastic.

12. The energy conduit support according to claim 1, wherein said two opposite side walls are upper and lower sides, and said two other side walls are lateral sides between said upper and lower sides.

* * * * *